(12) United States Patent
Belen et al.

(10) Patent No.: US 11,725,760 B2
(45) Date of Patent: Aug. 15, 2023

(54) COUPLING SEGMENT WITH MONOLITHIC PIVOT

(71) Applicant: ASC Engineered Solutions, LLC, Portsmouth, NH (US)

(72) Inventors: Jordan Cameron Belen, West Warwick, RI (US); Jeffrey Brian Shaffer, Lipan, TX (US); Matthew William McNamara, Portsmouth, RI (US); Stephen Eric Scott, North Kingstown, RI (US)

(73) Assignee: ASC Engineered Solutions, LLC, Portsmouth, NH (US)

( * ) Notice: Subject to any disclaimer, the term of this patent is extended or adjusted under 35 U.S.C. 154(b) by 0 days.

(21) Appl. No.: 17/749,992

(22) Filed: May 20, 2022

(65) Prior Publication Data
US 2022/0275890 A1    Sep. 1, 2022

Related U.S. Application Data

(62) Division of application No. 16/369,127, filed on Mar. 29, 2019, now Pat. No. 11,371,630.

(51) Int. Cl.
*F16L 23/10* (2006.01)
*F16L 23/00* (2006.01)

(52) U.S. Cl.
CPC ............ *F16L 23/10* (2013.01); *F16L 23/003* (2013.01)

(58) Field of Classification Search
CPC ............ F16L 23/04; F16L 23/08; F16L 23/10
See application file for complete search history.

(56) References Cited

U.S. PATENT DOCUMENTS

| 1,288,204 | A | * | 12/1918 | Roscetta | ................ | F16L 23/10 24/285 |
| 1,532,596 | A | * | 4/1925 | Madsen | ................ | B65B 19/02 24/284 |
| 3,016,249 | A | * | 1/1962 | Contreras | ............... | F16L 17/08 277/621 |
| 3,249,371 | A | * | 5/1966 | Peterman | ................ | F16L 33/23 285/259 |

(Continued)

FOREIGN PATENT DOCUMENTS

| DE | 102007043292 | 3/2009 |
| DE | 202009004932 | 9/2009 |

(Continued)

OTHER PUBLICATIONS

Belen, Jordan Cameron; Non-Final Office Action for U.S. Appl. No. 16/369,127, filed Mar. 29, 2019, dated Sep. 20, 2021, 23 pgs.

(Continued)

*Primary Examiner* — Sarang Afzali
(74) *Attorney, Agent, or Firm* — Taylor English Duma LLP

(57) ABSTRACT

A coupling segment includes an arcuate segment body defining a first end and a second end opposite the first end; a first shoulder that is formed proximate to the first end and comprises a first fastener pad extending outwardly from the arcuate segment body, the first shoulder further defining an interior edge; and a first pivot extending from the first shoulder at the interior edge, wherein the first pivot is cast monolithically with the arcuate segment body and the first shoulder.

17 Claims, 13 Drawing Sheets

(56) References Cited

U.S. PATENT DOCUMENTS

| | | | | |
|---|---|---|---|---|
| 3,794,361 | A | * | 2/1974 | Westberg ............... F16L 23/08 285/336 |
| 3,971,573 | A | * | 7/1976 | Clements ............... F16L 23/08 285/190 |
| 4,391,458 | A | * | 7/1983 | Blakeley ............... F16L 41/12 285/112 |
| 4,408,788 | A | * | 10/1983 | Beukema ............... F16L 23/08 285/112 |
| 4,702,499 | A | * | 10/1987 | deRaymond ............ F16L 17/04 285/912 |
| 4,940,261 | A | * | 7/1990 | Somers Vine .......... F16L 23/08 285/112 |
| 5,018,768 | A | * | 5/1991 | Palatchy ................ F16L 23/10 285/24 |
| 5,037,141 | A | * | 8/1991 | Jardine ................. F16L 23/04 285/369 |
| 5,121,946 | A | * | 6/1992 | Jardine ................. F16L 55/172 285/379 |
| 5,161,836 | A | * | 11/1992 | McKinnon ............. F16L 21/06 285/23 |
| 5,246,257 | A | * | 9/1993 | Kojima .................. F16L 21/06 285/112 |
| 5,605,357 | A | * | 2/1997 | Bird ...................... F16L 55/172 285/379 |
| 5,947,533 | A | * | 9/1999 | Fisher .................... F16L 23/04 285/364 |
| 6,062,610 | A | * | 5/2000 | Andersson .............. F16L 23/08 285/424 |
| 6,139,069 | A | * | 10/2000 | Radzik .................. F16L 23/04 285/112 |
| 7,712,796 | B2 | | 5/2010 | Gibb et al. |
| 8,517,430 | B2 | * | 8/2013 | Dole ...................... F16L 23/08 285/368 |
| 8,556,302 | B2 | * | 10/2013 | Dole ...................... F16L 21/005 285/112 |
| 8,621,741 | B2 | * | 1/2014 | Hagiya ................... F16L 23/08 29/515 |
| 9,039,046 | B2 | * | 5/2015 | Beagen, Jr. ............ F16L 17/025 285/367 |
| 9,151,421 | B2 | | 10/2015 | Wachter et al. |
| 9,168,585 | B2 | * | 10/2015 | Schell .................... F16L 21/06 |
| 9,194,516 | B2 | * | 11/2015 | Beagen, Jr. ............ F16L 21/065 |
| 9,243,731 | B2 | | 1/2016 | Breitenbach et al. |
| 9,500,307 | B2 | * | 11/2016 | Beagen, Jr. ............ F16L 17/025 |
| 9,534,715 | B2 | * | 1/2017 | Beagen, Jr. ............ F16L 17/025 |
| 9,599,134 | B2 | | 3/2017 | Baudin et al. |
| 11,371,630 | B2 | | 6/2022 | Belen et al. |
| 11,644,134 | B2 | | 5/2023 | Belen et al. |
| 2007/0052239 | A1 | | 3/2007 | Dole |
| 2008/0282514 | A1 | | 11/2008 | Van Walraven |
| 2008/0284161 | A1 | * | 11/2008 | Dole ...................... F16L 23/18 285/148.8 |
| 2011/0154646 | A1 | * | 6/2011 | Hagiya ................... F16L 23/08 29/505 |
| 2013/0187345 | A1 | | 7/2013 | Beagan, Jr. |
| 2017/0082227 | A1 | * | 3/2017 | Wortmann .............. F16L 23/04 |
| 2017/0328501 | A1 | * | 11/2017 | Motoyama .............. F16L 23/08 |
| 2018/0135786 | A1 | * | 5/2018 | Bourbon ................. F16L 23/06 |
| 2018/0216754 | A1 | | 8/2018 | Ciasulli et al. |
| 2019/0032825 | A1 | | 1/2019 | McNamara et al. |
| 2020/0284382 | A1 | * | 9/2020 | Lenz ...................... F16B 2/08 |
| 2020/0309295 | A1 | | 10/2020 | Belen et al. |
| 2020/0332934 | A1 | * | 10/2020 | Duncan .................. F16L 23/18 |
| 2022/0275889 | A1 | | 9/2022 | Belen et al. |
| 2022/0282811 | A1 | | 9/2022 | Belen et al. |

FOREIGN PATENT DOCUMENTS

| | | |
|---|---|---|
| EP | 1950480 | 7/2009 |
| WO | 2012154037 | 11/2012 |
| WO | 2020205207 | 10/2020 |

OTHER PUBLICATIONS

Belen, Jordan Cameron; Notice of Allowance for U.S. Appl. No. 16/369,127, filed Mar. 29, 2019, dated Mar. 1, 2022, 9 pgs.

Belen, Jordan Cameron; Requirement for Restriction/Election for U.S. Appl. No. 16/369,127, filed Mar. 29, 2019, dated Jul. 23, 2021, 8 pgs.

Belen, Jordan Cameron; International Preliminary Report on Patentability for PCT Application No. PCT/US20/22620, filed Mar. 13, 2020, dated Oct. 14, 2021, 12 pgs.

Belen, Jordan Cameron; International Search Report and Written Opinion for PCT Application No. PCT/US20/22620 filed Mar. 13, 2020, dated Jun. 11, 2020, 13 pgs.

Belen, Jordan Cameron; Non-Final Office Action for U.S. Appl. No. 17/749,972, filed May 20, 2022, dated Sep. 22, 2022, 22 pgs.

Belen, Jordan Cameron; Notice of Allowance for U.S. Appl. No. 17/749,972, filed May 20, 2022, dated Jan. 20, 2023, 12 pgs.

* cited by examiner

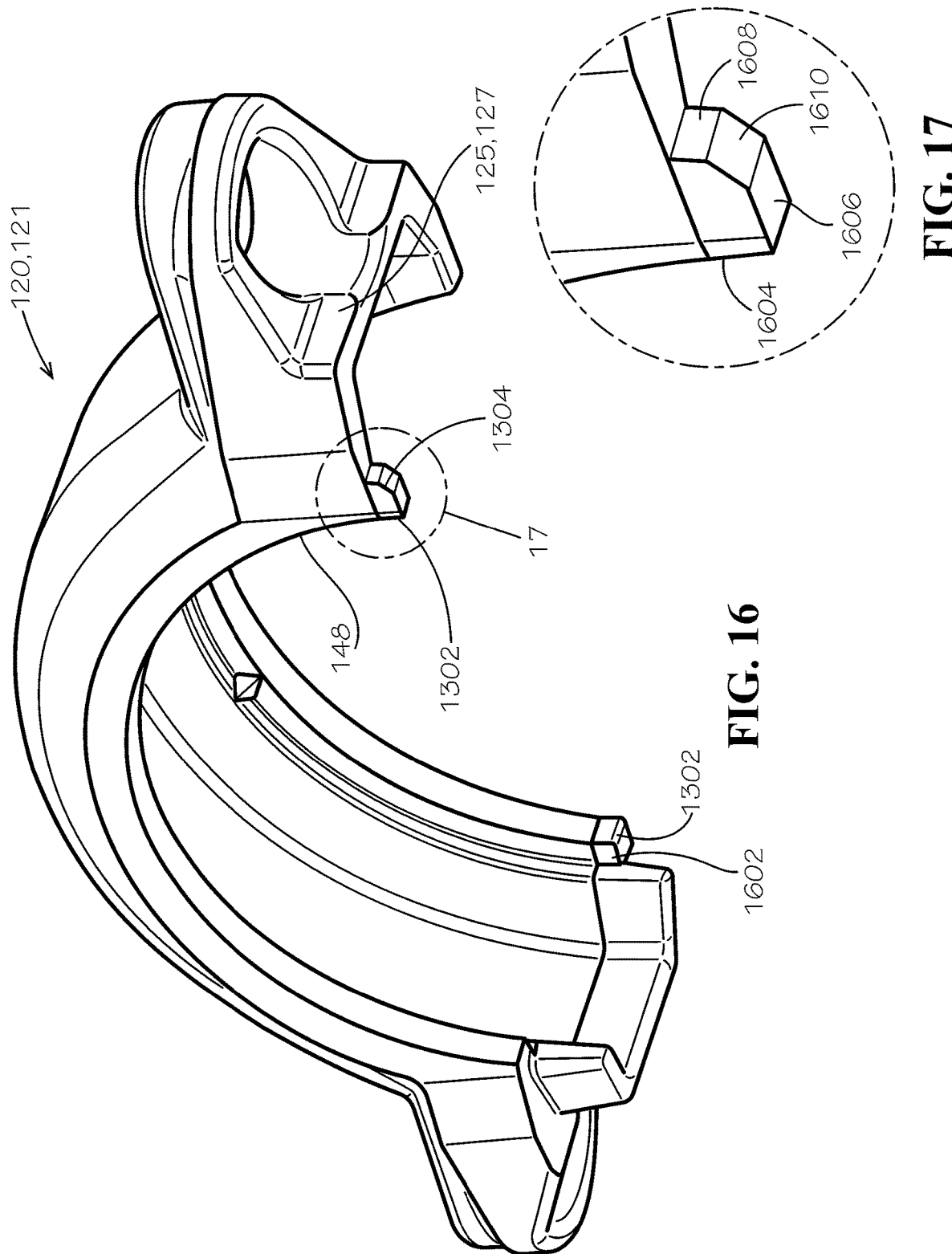

COUPLING SEGMENT WITH MONOLITHIC PIVOT

CROSS-REFERENCE TO RELATED APPLICATIONS

The present application is a divisional of U.S. application Ser. No. 16/369,127, filed Mar. 29, 2019, which is hereby specifically incorporated by reference herein in its entirety.

TECHNICAL FIELD

This disclosure relates to pipe couplings. More specifically, this disclosure relates to a pivot clip for pipe couplings.

BACKGROUND

Pipes can typically be joined at their ends by pipe couplings comprising two segments and two fasteners joining distal ends of the segments. Each fastener can typically comprise a nut and a bolt. The fasteners typically need to be tightened one at a time, incrementally and alternatingly, such that the space between each opposite end of the tightened coupling is substantially the same. This process can take time and can encounter difficulties when, for example, one of the ends is not accessible when the coupling is fitted onto the pipe ends.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is a pipe coupling comprising: a first segment comprising a first end and a second end distal to the first end; a second segment comprising a first end and a second end distal to the first end; a first tightening element configured to draw the second end of the first segment towards the first end of the second segment; a second tightening element configured to draw the first end of the first segment towards the second end of the second segment; and a pivot clip between the second end of the first segment and the first end of the second segment, the pivot clip configured to maintain a separation distance between the second end of the first segment and the first end of the second segment.

Also disclosed is a method of coupling two pipes, the method comprising: fastening two coupling segments into an untightened configuration; the two coupling segments comprising a first segment and a second segment, the first segment comprising a first end and a second end distal to the first end, the second segment comprising a first end and a second end distal to the first end, wherein fastening the two coupling segments comprises: placing a pivot clip between the second end of the first segment and the first end of the second segment, the pivot clip configured to maintain a separation distance between the second end of the first segment and the first end of the second segment, and tightening a first tightening element to draw the second end of the first segment towards the first end of the second segment; placing ends of the two pipes between the two coupling segments; and tightening a second tightening element to draw the first end of the first segment towards the second end of the second segment.

Additionally, disclosed is a coupling segment comprising an arcuate segment body defining a first end and a second end opposite the first end; a first shoulder that is formed proximate to the first end and comprises a first fastener pad extending outwardly from the arcuate segment body, the first shoulder further defining an interior edge; and a first pivot extending from the first shoulder at the interior edge, wherein the first pivot is cast monolithically with the arcuate segment body and the first shoulder.

A pipe coupling is also disclosed, the pipe coupling comprising a monolithically-cast first coupling segment comprising a first end and a second end distal to the first end, a first pivot each formed proximate to the first end; a second coupling segment comprising a first end and a second end distal to the first end, the first pivot engaging the second coupling segment proximate to the first end of the second coupling segment; and a first tightening element configured to draw the first end of the monolithically-cast first coupling segment towards the first end of the second coupling segment.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 16 is a perspective view of a coupling segment of the pipe coupling of FIG. 15.

FIG. 17 is a detail view of a pivot of the segment of FIG. 16 and taken from detail 17 in FIG. 16.

DETAILED DESCRIPTION

Figure 1:
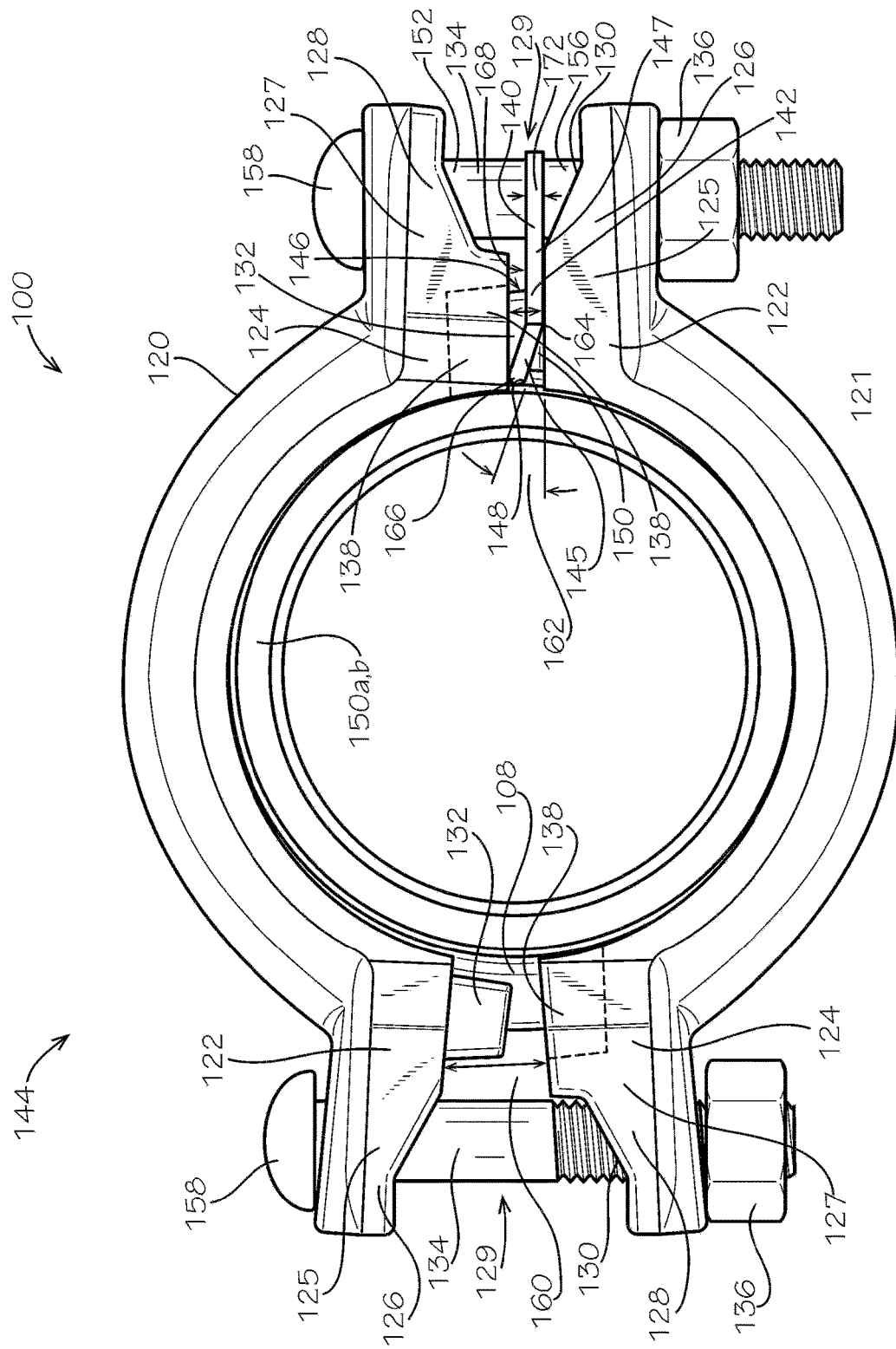
FIG. 1 is a front view of a pipe coupling comprising a pivot clip in accordance with one aspect of the current disclosure, showing the pipe coupling in an untightened configuration.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a pivot clip for pipe couplings and associated methods, systems, devices, and various apparatus. It would be understood by one of skill in the art that the disclosed pivot clip is described in but a few exemplary embodiments among many. No particular terminology or description should be considered limiting on the disclosure or the scope of any claims issuing therefrom.

For ease of understanding, the use of the directional terms herein, such as right, left, front, back, top, bottom, and the like can refer to the orientation shown and described in the corresponding figures, but these directional terms should not be considered limiting on the orientation or configuration required by the present disclosure. The use of ordinal terms herein, such as first, second, third, fourth, and the like can refer to elements associated with elements having matching ordinal numbers. For example, a first light bulb can be associated with a first light socket, a second light bulb can be associated with a second light socket, and so on. However, the use of matching ordinal numbers should not be considered limiting on the associations required by the present disclosure.

FIG. 1 is a front view of a pipe coupling 100, in accordance with one aspect of the present disclosure. The pipe coupling 100 can couple two pipes 154a,b together. In some aspects, the coupling 100 can be a slip-on coupling, such as the slip-on coupling described in U.S. Pat. No. 9,194,516, issued on Nov. 24, 2015, which is hereby incorporated by reference in its entirety. The pipe coupling can comprise a first segment 120, a second segment 121, and a gasket 108 positioned and held between the first segment 120 and the second segment 121. In some aspects, each of the segments 120,121 can be constructed similarly, such as casted from the same mold (not shown). In example aspects, each of the segments 120,121 can comprise a first end 122 and a second end 124 distal to the first end 122. As shown in FIG. 1, in some aspects, the segments 120,121 can be configured in the pipe coupling 100 to be 180-degree rotations of each other, with the first end 122 of the first segment 120 proximate to the second end 124 of the second segment 121, and the second end 124 of the first segment 120 proximate to the first end 122 of the second segment 121. In some aspects, the two pipes 154a,b can be grooved-end pipes defining grooves proximate each end, and the segments 120,121 can each be configured to engage a groove in each pipe 154a,b upon tightening of the coupling to prevent separation of the pipes 154a,b. The gasket 108 can then seal a joint defined between the pipes 154a,b.

For each segment 120,121, in some aspect, a first shoulder 125 and a second shoulder 127 can protrude outwardly from the segments 120,121 proximate to each of the first end 122 and the second end 124, respectively. The shoulders 125,127 can comprise fastener pads 126,128. A first fastener pad 126 proximate to the first end 122 of the first segment 120 can be fastened to a second fastener pad 128 proximate to the second end 124 of the second segment 121. The remaining fastener pads 126,128 can be fastened in corresponding fashion.

In some aspects, a tongue 132 can protrude from the first end 122 of each segment 120,121. Likewise, in some aspects, a groove 138 can be defined in the second shoulder 127, the groove 138 configured to receive the tongue 132.

The fastener pads 126,128 can comprise tightening elements 129. The tightening elements 129 can comprise fastener holes (not shown) extending through each fastener pad 126,128. Each fastener hole can receive a bolt 134. A nut 136 can be configured to secure the bolt 134 in the fastener holes 130. A first fastener pad 126 proximate to the first end 122 of the first segment 120 can be fastened to a second fastener pad 128 proximate to the second end 124 of the second segment 121 with a first bolt 134 and a first nut 136, and a second fastener pad 128 proximate to the second end 124 of the first segment 120 can be fastened to a first fastener pad 126 proximate to the first end 122 of the second segment 121 with a second bolt 134 and a second nut 136.

The pipe coupling 100 can further comprise a pivot clip 140 configured to maintain a separation distance 142 between the second end 124 of the first segment 120 and the first end 122 of the second segment 121. In example aspects and as shown in FIG. 1, the pipe coupling can be in an untightened configuration 144. In the untightened configuration 144, the separation distance 142 between the ends 122,124 proximate to the pivot clip 140 can be less than a tightening gap 160 between the ends 122,124 distal to the pivot clip 140.

Figure 2:
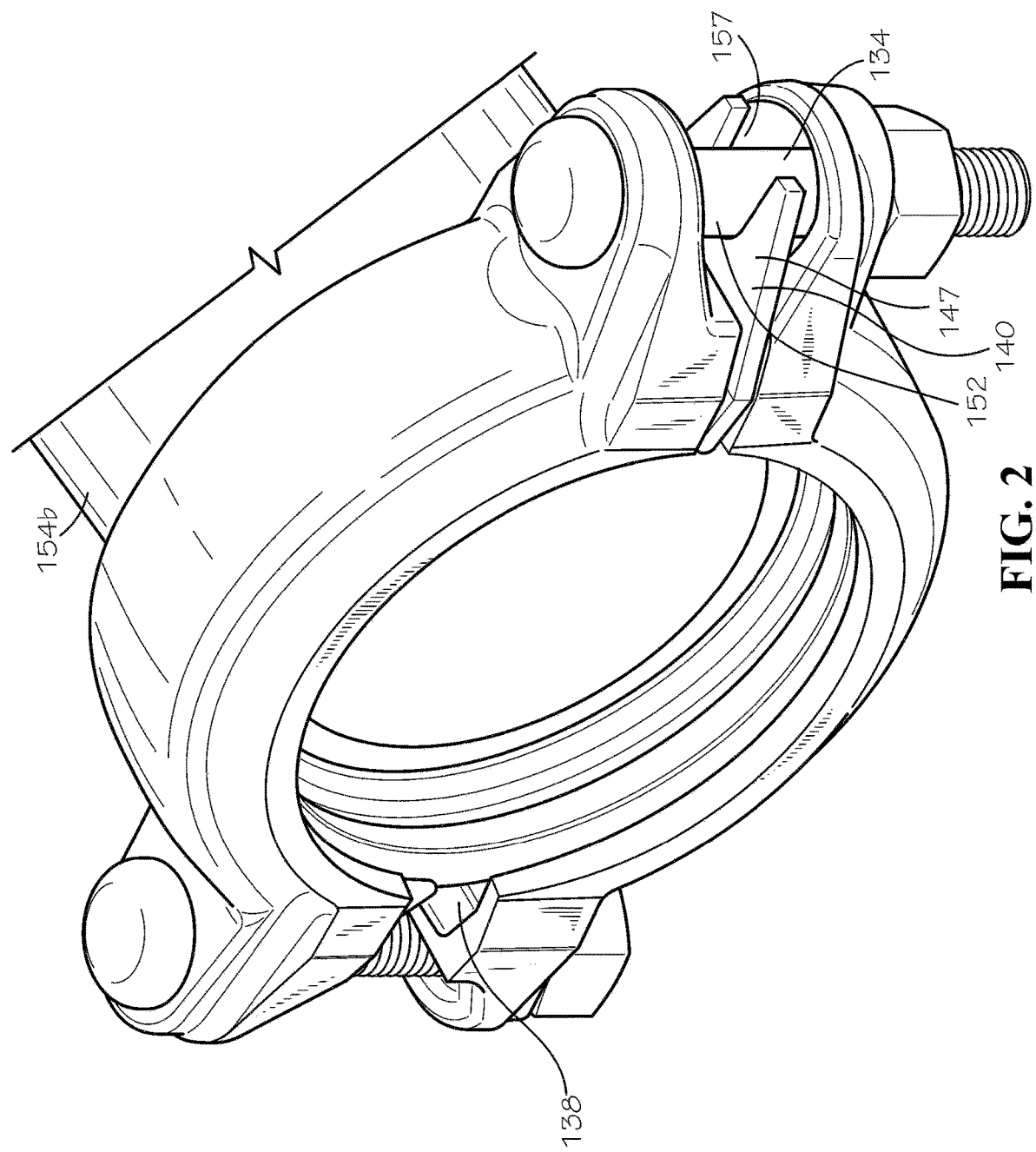
FIG. 2 is a perspective view of the pipe coupling of FIG. 1 positioned on an end of a pipe.
Figure 3:
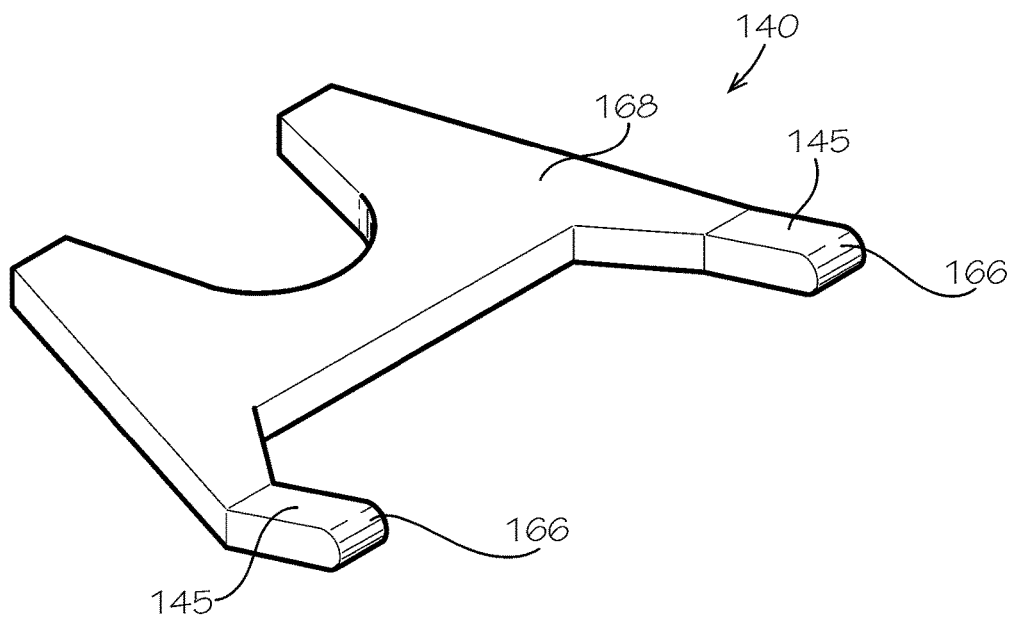
FIG. 3 is a perspective view of the pivot clip of FIG. 1.

The pivot clip 140 can comprise two arms 145 (only one arm shown in FIG. 1, a second arm 145 shown in FIG. 3 connected to a body 147. The pivot clip 140 can be configured to substantially surround an outer surface 146 of the tongue 132. In example aspects, the arms 145 can extend toward an interior edge 148 of the shoulders 125,127, such that a lateral side 150 of the tongue 132 is covered by the arm 145. The bolt can define an inner portion 152 proximate to the pipe 154a,b, and an outer portion 156 distal to the pipe 154a,b. The pivot clip 140 can further be configured to surround the inner portion 152 of the bolt 134, such as by receiving the bolt 134 in a cutout 157 (shown in FIG. 2) of the body 147 of the pivot clip 140.

Figure 7:
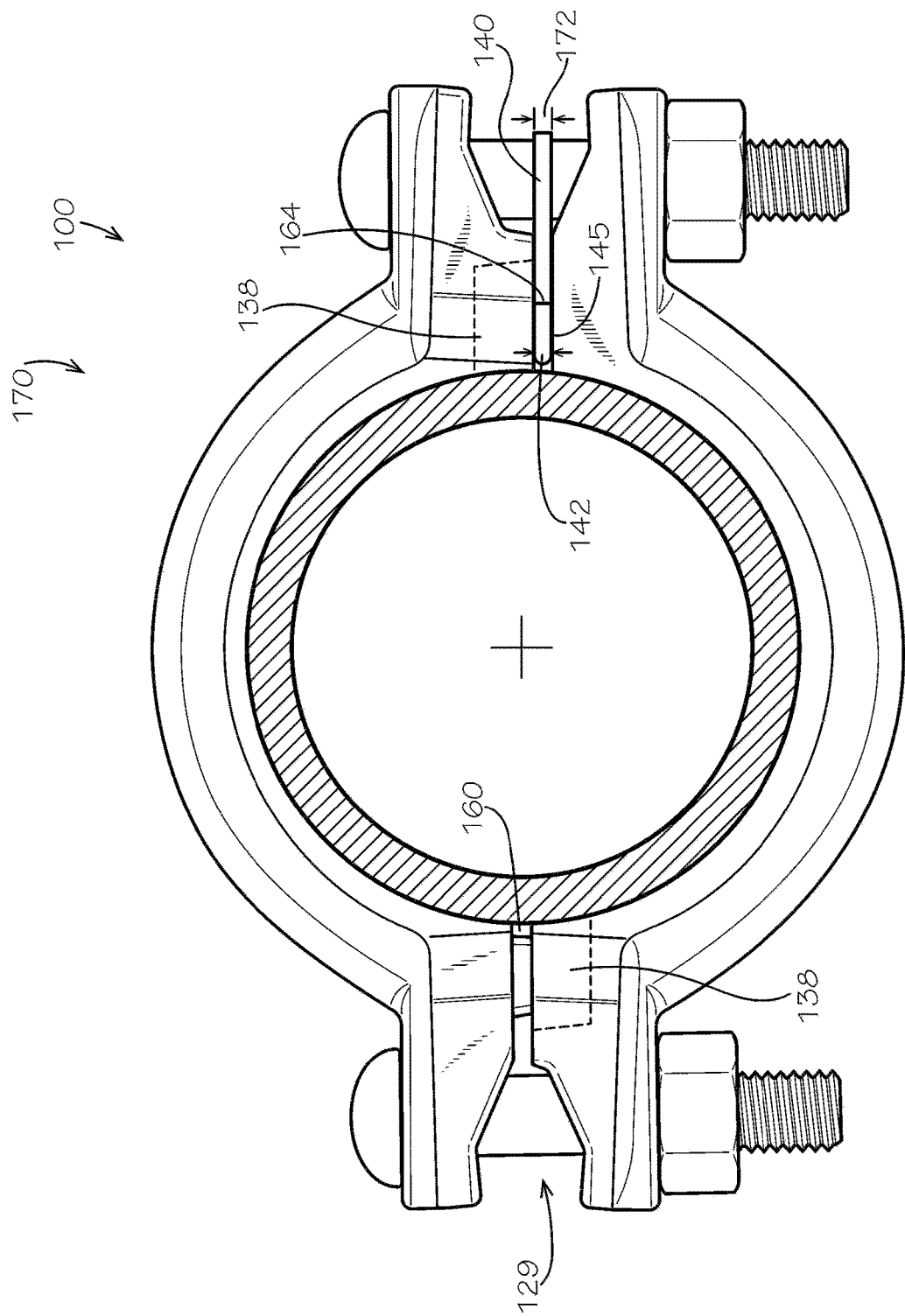
FIG. 7 is a front view of the pipe coupling of FIG. 1 in a tightened configuration.

The arms 145 of the pivot clip 140 can be angled with respect to the body 147. In example aspects, the arms 145 can be angled toward the groove 138 in the first segment 120, as well as toward a head 158 of the bolt 134. The pivot clip 140 can further comprise a bend 164, a tip 166 of the arm 145, and a top surface 168. The bend 164 can define an angle 162 that the arm 145 makes with the body 147. Slight tightening of the nut 136 on the bolt 134 at the second end 124 of the first segment 120 and the first end 122 of the second segment 121 can bring those ends 122,124 towards each other and thereby rotate the pivot clip 140 such that the bend 164, the tip 166, and the top surface 168 of the body 147 to simultaneously contact the ends 122,124 of the segments 120,121, as shown in FIG. 2. In example aspects, the nut 136 of each bolt 134 can be tightened such that any further tightening of the nuts 136 and bolts 134 would cause the pivot clip 140 to deform and flatten, as shown in FIG. 7. Thus, the pipe coupling 100 can be configured in the untightened configuration 144 by screwing the nut 136 on the bolt 134 using a first torque that is less than a second torque needed to deform and flatten the pivot clip 140 and put the pipe coupling 100 in a tightened configuration 170 (see FIG. 7). In other aspects, placing the pipe coupling 100 in the untightened configuration 144 can comprise deforming and flattening the pivot clip 140 while leaving the opposite ends 122,124 of the segments 120,121 spaced apart sufficient to insert the pipes 154a,b.

The pivot clip 140 can have a substantially uniform thickness 172 in some aspects. For example, pivot clips 140 can be die cut from sheet metal in some aspects. In some aspects, the arms 145 can thereafter be bent relative to the body 147 of the pivot clip 140. In other aspects, the pivot clips 140 can be formed from any desired method, such as casting or 3D printing, and the disclosed methods of forming pivot clips 140 should not be considered limiting on the current disclosure.

FIG. 2 is a perspective view of the pipe coupling. In this view, the cutout 157 of the body 147 of the pivot clip 140 is shown, surrounding at least the inner portion 152 of the bolt 134. In the current aspect, the cutout 157 is sized such that the body 147 extends past the bolt 134. One of the pipes 154a,b to be joined is shown.

FIG. 3 is a perspective view of the pivot clip 140, showing the top surface 168. A bottom surface 518 (shown in FIG. 5) is defined opposite from the top surface 168. In example aspects, the tips 166 of the arms 145 can be rounded.

Figure 4:
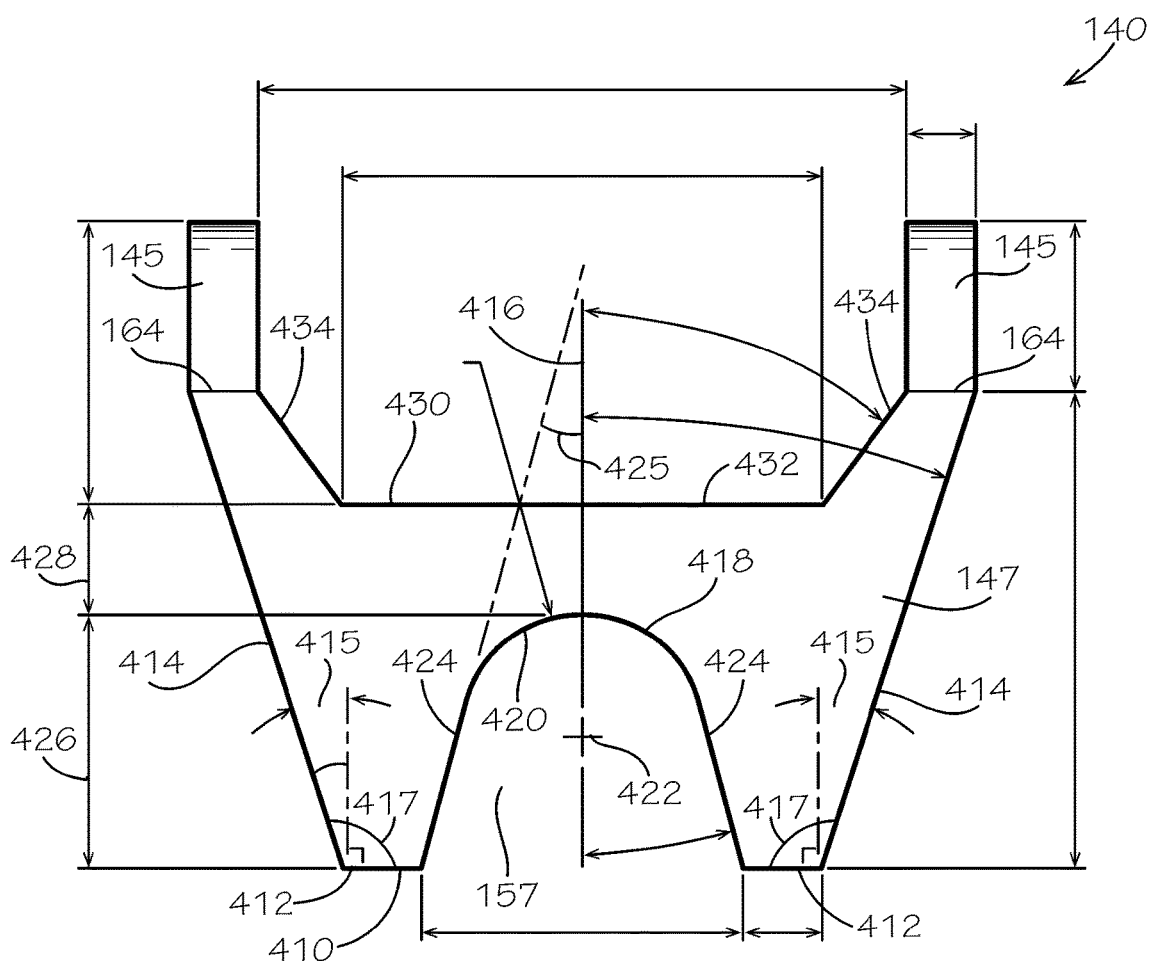
FIG. 4 is a top view of the pivot clip of FIG. 1.

FIG. 4 is a top view (orthographic projection) of the pivot clip 140, showing the body 147, the arms 145, the bend 164, and the cutout 157. The body 147 can further comprise an outside edge 410 that defines the cutout 157 and a pair of prongs 412 adjacent to the cutout 157. Excluding the cutout 157, the outside edge 410 can be straight. In example aspects, the outside edge can comprise two prongs 412, each prong 412 on either side of the cutout 157 and configured to be the same length. The body 147 can further comprise a pair of opposing lateral edges 414. Within the top orthographic projection, each lateral edge 414 can define an angle 415 with respect to a direction perpendicular to the outside edge 410. In example aspects, the lateral edge 414 can define an angle 417 with the outside edge 410 that is obtuse. The two lateral edges 414 can be a symmetric reflection of each other about a center line 416 of the pivot clip 140.

The cutout 157 of the body 147 can define a cutout edge 418. The cutout edge 418 can be curvilinear and can define a circular arc 420 having a center 422, and a pair of straight segments 424. The circular arc 420 can be complementary to the inner portion 152 of the bolt 134. Each straight segment 424 can form an angle 425 with the center line 416. The two straight segments 424 can be symmetric about the center line 416. The cutout 157 can further define a depth 426. The body 147 can define a minimal distance 428 between the cutout edge 418 and an interior edge 430 of the body 147. The interior edge 430 of the body 147 can comprise a recessed portion 432 and a pair of connecting portions 434 extending to the arms 145.

Figure 5:
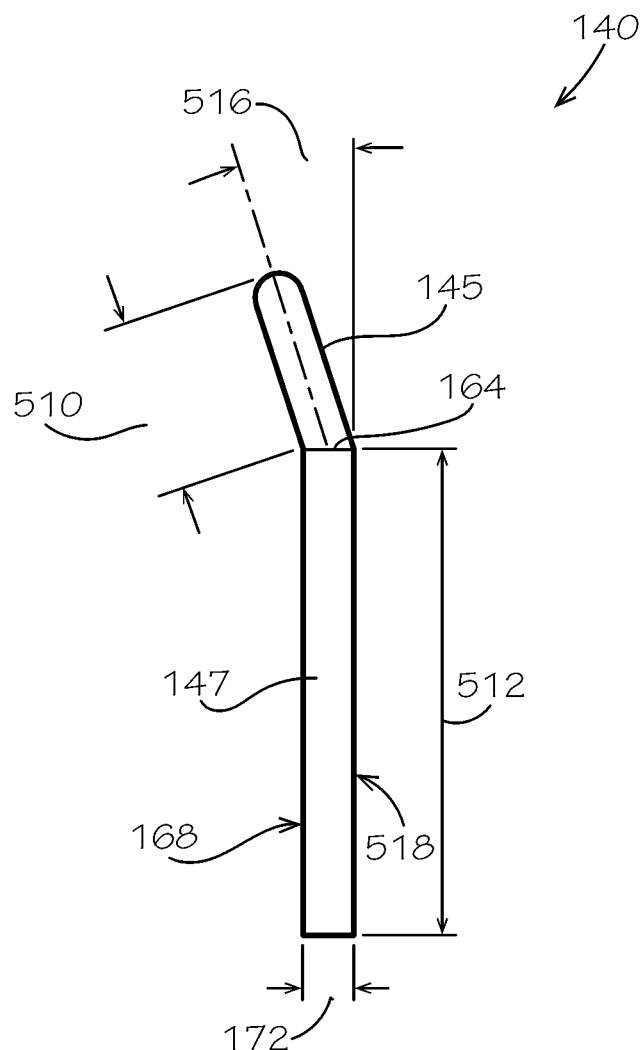
FIG. 5 is a side view of the pivot clip of FIG. 1.

FIG. 5 shows a side orthographic projection of the pivot clip 140. A length 510 of the arms 145 can be shorter than a length 512 of the body 147. The thickness 172 of the pivot clip 140 can be uniform as shown. The bend 164 can define a bend angle 516.

Figure 6:
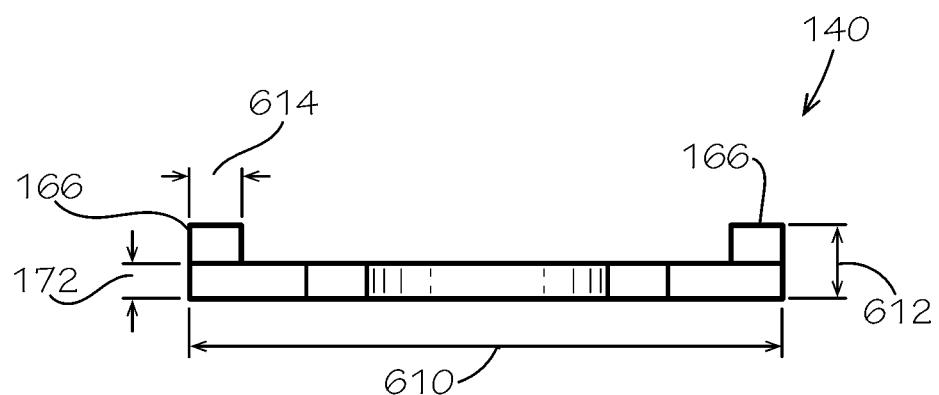
FIG. 6 is a front view of the pivot clip of FIG. 1.

FIG. 6 shows a front orthographic projection of the pivot clip 140. The thickness 172 is shown, as well as a width 610 of the pivot clip 140. The pivot clip 140 can also define a tip height 612, and the tips 166 can define a tip width 614.

FIG. 7 shows a front view of the pipe coupling 100, in the tightened configuration 170. The tightening gap 160 opposite the pivot clip 140 can be configured to be the same as the separation distance 142 between the segments 120,121 proximate the pivot clip 140. In the tightened configuration 170, the tightening gap 160 can be a minimum tightening gap, and the separation distance 142 can be a minimum separation distance. The separation distance 142 in the tightened configuration 170 can be the same as the thickness 172 of the pivot clip 140. The pipe coupling 100 can be configured to change from the untightened configuration 144 shown in FIG. 1 to the tightened configuration 170 shown in FIG. 7 by tightening only the tightening element 129 distal to the pivot clip 140. In the process of tightening, in some aspects, the pivot clip 140 arms 145 can be flattened, such that the bend 164 in the pivot clip 140 is removed. When the pipe coupling 100 is untightened, the pivot clip 140 can be configured to elasticity deform to recover the bend 164. However, in other aspects, the pivot clip 140 may only plastically deform such that the bend 164 does not recover after untightening.

Figure 8:
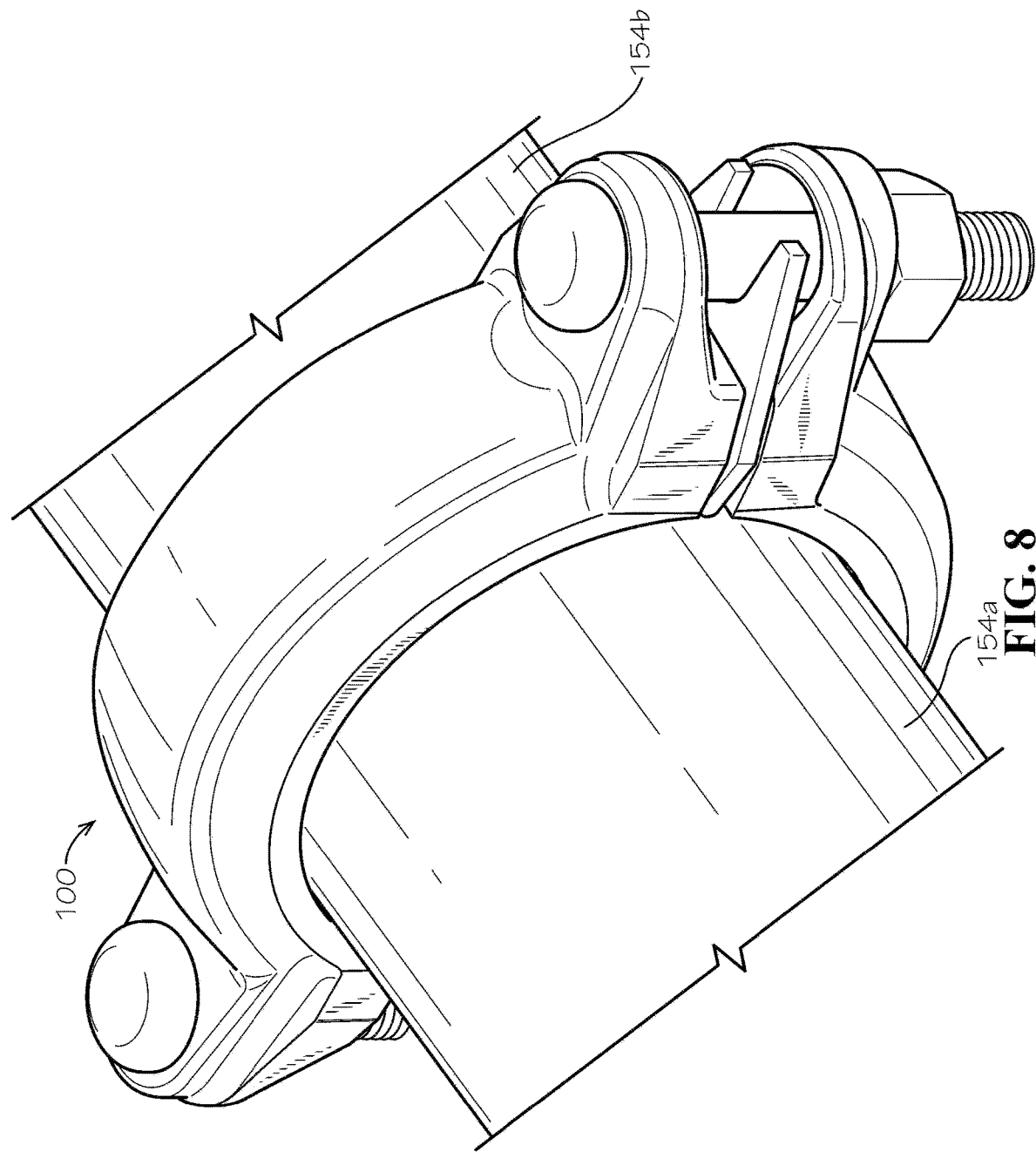
FIG. 8 is a perspective view of the pipe coupling connecting two pipes.

FIG. 8 is a perspective view of the pipe coupling 100 connecting two pipes 154a,b. In the current aspect, each segment 120,121 defines keys engaging the grooves defined in the ends of each pipe 154a,b, and the gasket 108 seals the joint therebetween. As shown the pivot clip 140 can be sized such that it does not extend into the path of the pipes 154a,b between the segments 120,121 when the pivot clip 140 is in position between the respective ends 122,124 of the segments 120,121.

Figure 9:
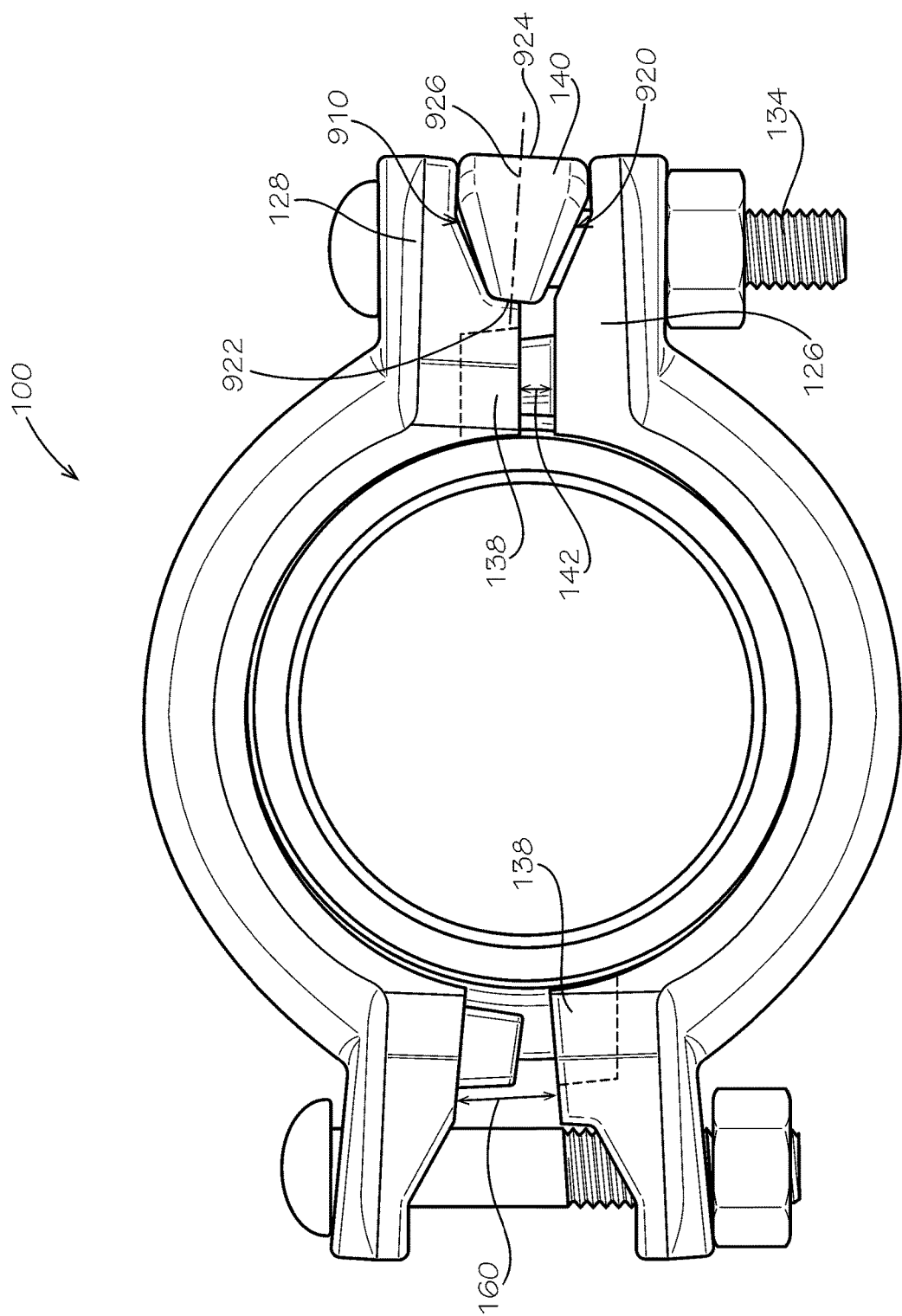
FIG. 9 is a side view of the pipe coupling with a pivot clip in accordance with another aspect of the current disclosure.

FIG. 9 is a side view of the pipe coupling 100 with another exemplary aspect of a pivot clip 140 in accordance with the present disclosure. In the untightened configuration 144, the tightening gap 160 distal to the pivot clip 140 can be wider than the separation distance 142 proximate to the pivot clip 140. In example aspects, the pivot clip 140 can encircle the bolt 134. The fastener pads 126,128 can contact the pivot clip 140 substantially along an upper surface 910 and a lower surface 920 of the pivot clip 140. An interior portion 922 of the pivot clip 140 can be narrower than an outer portion 924 of the pivot clip 140. The pivot clip 140 can be symmetrical about a middle plane 926 of the pivot clip 140. The upper and lower surfaces 910,920 can taper in a smooth curvilinear path from the wider outer portion 924 to the narrower interior portion 922. The pivot clip 140 of FIG. 9 can thereby define a shape that is complementary to the fastener pads 126,128 such that the pivot clip 140 can fit between the fastener pads 126,128 and maintain the separation distance 142.

Figure 10:
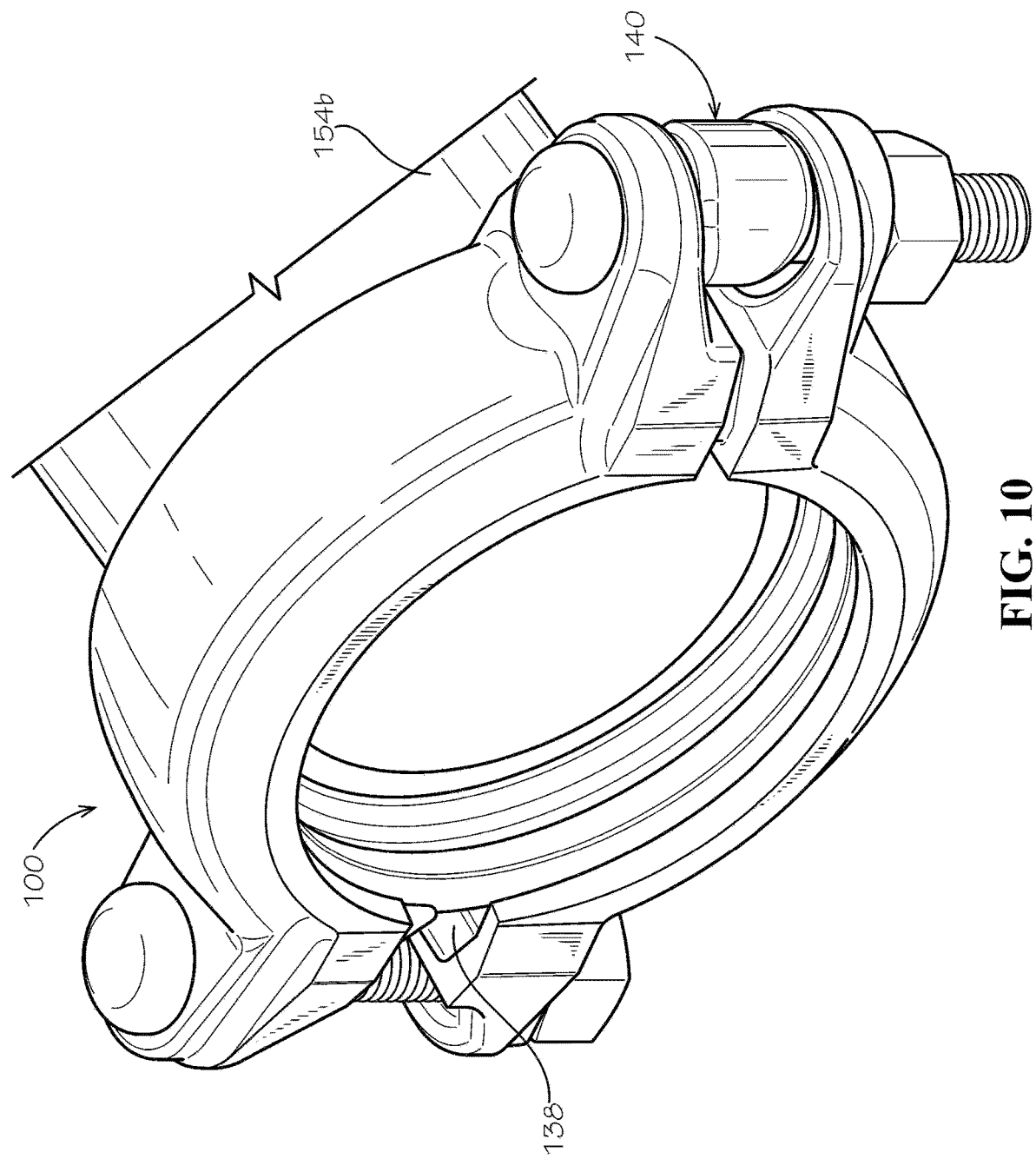
FIG. 10 is a perspective view of the pipe coupling of FIG. 9, shown positioned on an end of a pipe to be joined.

FIG. 10 is a perspective view of the pipe coupling 100 and pivot clip 140 of FIG. 9, showing one of the two pipes 154a,b to be joined.

Figure 11:
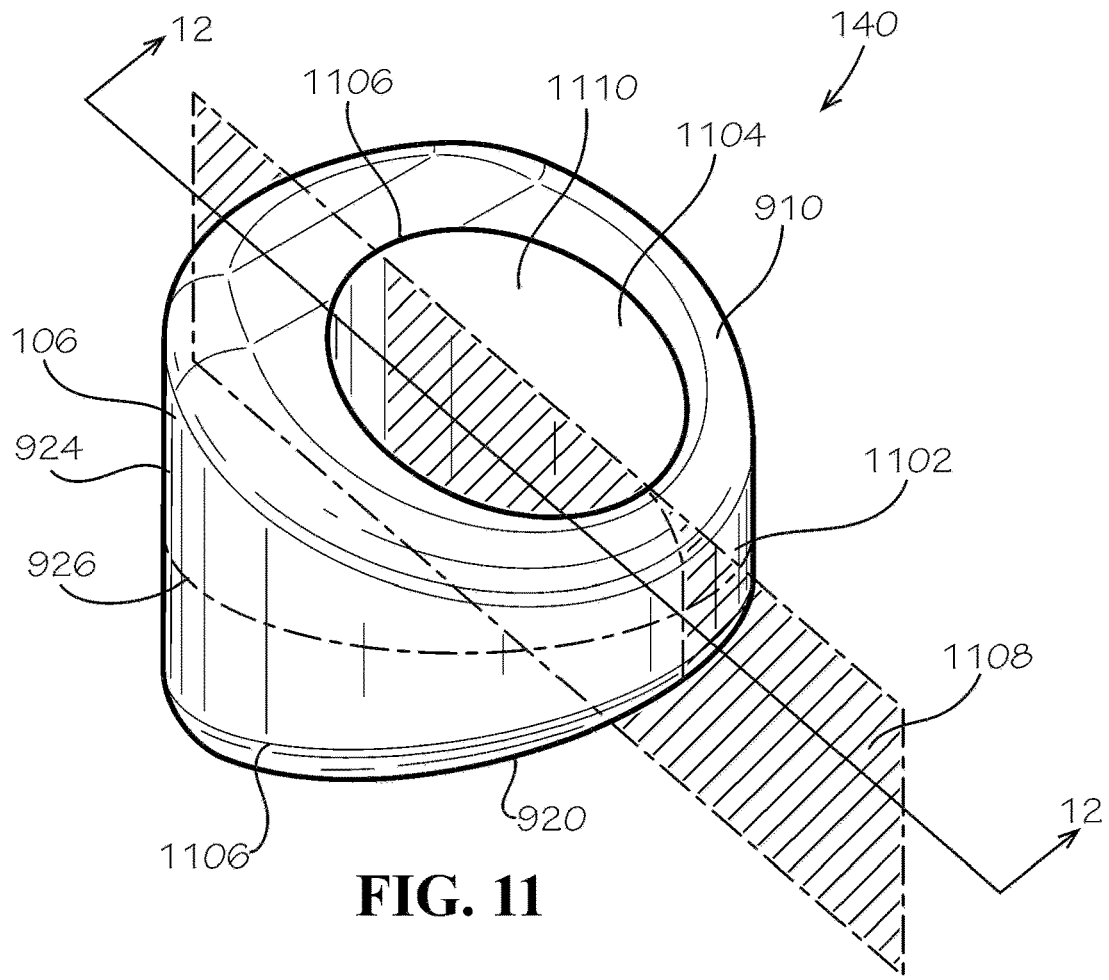
FIG. 11 is a perspective view of the pivot clip of FIG. 9.

FIG. 11 is a perspective view of the pivot clip 140 of FIG. 9. The pivot clip 140 can comprise an outer lateral wall 1102. A cross section through the middle plane 926 can reveal a shape of the outer lateral wall 1102 that is circular, ellipsoid, oblong curvilinear, rectilinear, or any other shape. The pivot clip 140 can further comprise an inner lateral wall 1104. A plurality of boundaries 1106 can be defined between the upper surface 910, the lower surface 920, the outer lateral wall 1102, and the inner lateral wall 1104 and can be smooth and curvilinear or, in other aspects, edge-like. In some aspects, the pivot clip 140 can be without sharp edges—that is, the edges can be smooth. The pivot clip can be toroidal in shape in some aspects. The pivot clip 140 can have a further reflection symmetry about a vertical plane 1108. The vertical plane 1108 can be defined by a line passing through a hole 1110 defined by the inner lateral wall 1104 and can bisect the pivot clip 140.

Figure 12:
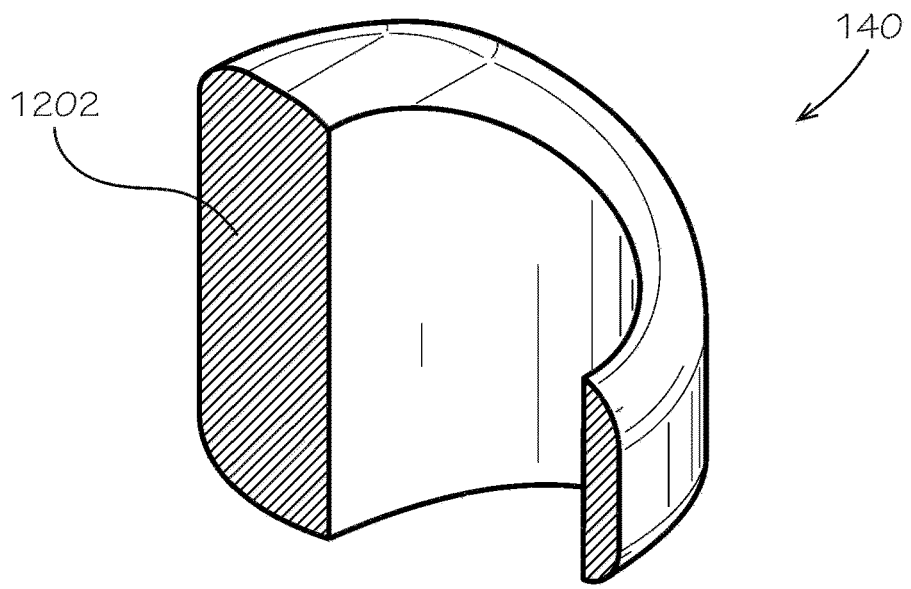
FIG. 12 is a cross-sectional perspective view of the pivot clip in FIG. 11 taken from line 12-12 in FIG. 11.

FIG. 12 shows a cross-sectional perspective view of the pivot clip 140 of FIG. 11. The pivot clip 140 can define a solid interior 1202 or, in other aspects, a hollow interior (not shown). The pivot clip 140 can be metal, such as stainless steel or ductile iron, and can be formed by casting, but any material or method known in the art would be suitable for making the pivot clip 140, such as injection-molded plastic.

Figure 13:
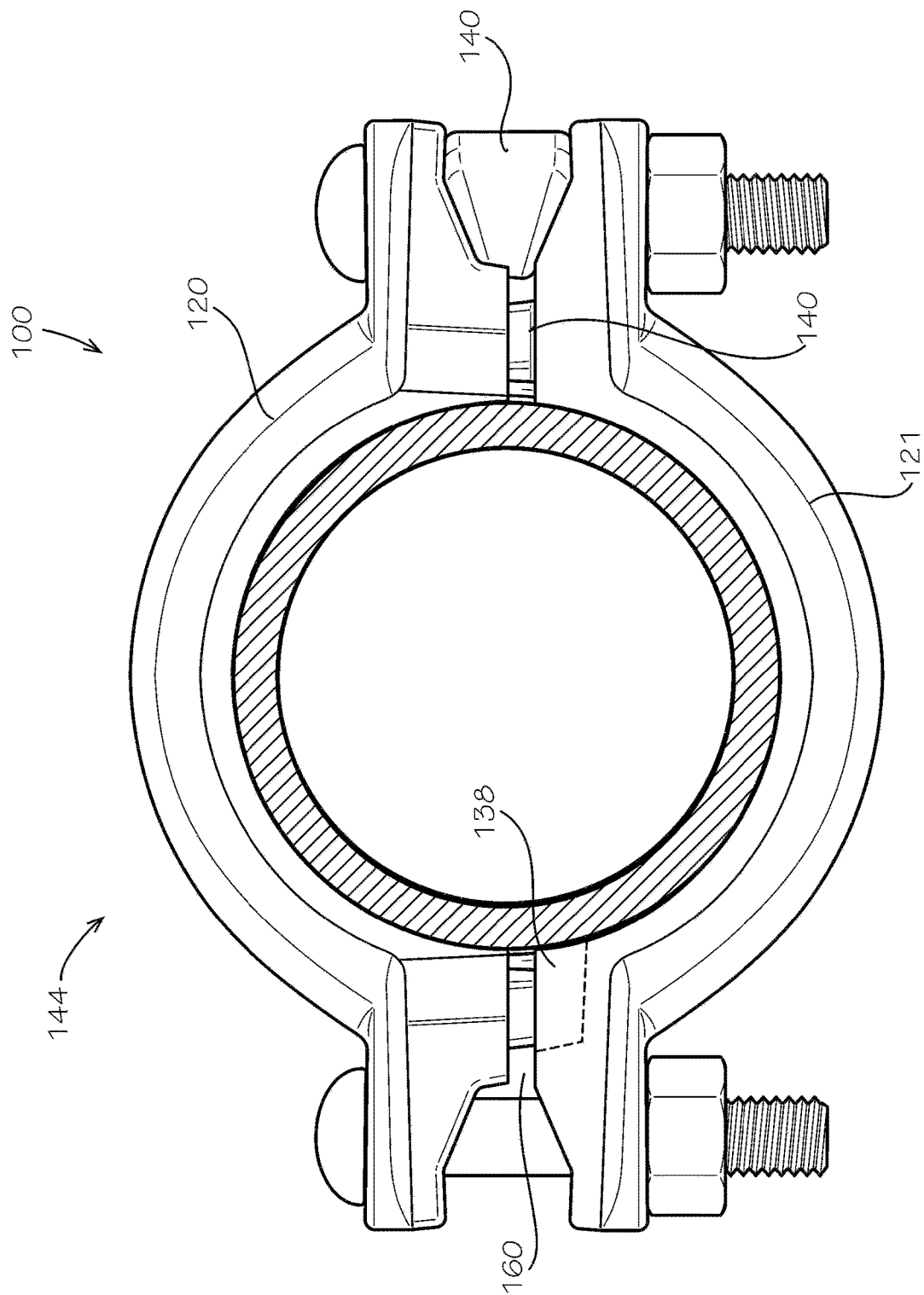
FIG. 13 is a front view of the pipe coupling and pivot clip FIG. 9 in the tightened configuration.

FIG. 13 is a front view of the pipe coupling 100 and pivot clip 140 of FIG. 9 in the tightened configuration 144. The tightening gap 160 opposite the pivot clip 140 can be configured to be the same as the separation distance 142 between the segments 120,121 proximate the pivot clip 140. In some aspects, the segments 120,121 can define grooves (not shown) below the respective fastener pads 128,126 that are complementary to the interior portion 922 the pivot clip 140. The pivot clip 140 can thus appear to be extending into the segments 120,121, as shown in FIG. 13.

The pipe coupling 100 with the pivot clip 140 of the current disclosure can couple two pipes 154a,b together by a following procedure. A first step can be to configure the pipe coupling 100 in the untightened configuration 144. The tightening element 129 proximate to the pivot clip 140 can be tightened up to an untightened point. The point or degree of tightening in the untightened configuration 144 can be such that the pipe coupling 100 has enough freedom of movement to allow the ends of two pipes 154a,b to be placed between the segments 120,121. These steps can be done prior to providing the pipe coupling 100 to an end user, such as prior to selling and shipping the pipe coupling 100. The degree of tightening can also be such that the pipe coupling 100 is drawn to the tightened configuration 170 by only tightening the tightening element 129 distal to the pivot clip 140, which eases the installation process for the end user. A second step can be to place the ends of two pipes 154a,b between the segments 120,121. A third step can be to tighten the tightening element 129 distal to the pivot clip 140, such that the tightening gap 160 is about the same as the separation distance 142. The configuration after the third step can be called the tightened configuration 170. This step engages the coupling segments 120,121 with the pipes 154a,b, such as by engaging the grooves defined in the ends of the pipes 154a,b when the pipes are grooved-end pipes. In some aspects, the coupling segments 120,121 can deform after engaging the pipes 154a,b to bend the coupling segments 120,121 around the pipes 154a,b, which can act as a mandrel for the coupling segments 120,121 bending. In some aspects, the point about which the coupling segments 120, 121 bends can be offset from a midpoint of each coupling segment and can be closer to the ends 122,124 with the pivot clip 140 than to the ends 122,124 without a pivot clip 140. In some aspects, the tightening gap 160 can be defined by the point at which the coupling segments 120,121 can no longer bend around the pipes 154a,b. The third step can also seal the joint between the pipes 154a,b by compressing the gasket 108 into sealing engagement with the pipes 154a,b.

The aforementioned procedure allows one of the tightening elements 129 to be tightened while keeping the ends 122,124 opposite to it wide enough to insert pipes 154a,b into the coupling 100 before tightening the opposite tightening element 129. The coupling 100 can be sold and shipped in the untightened configuration 144 such that only one of the tightening elements 129 needs to be tightened onsite where the pipes are to be joined.

Figure 14:
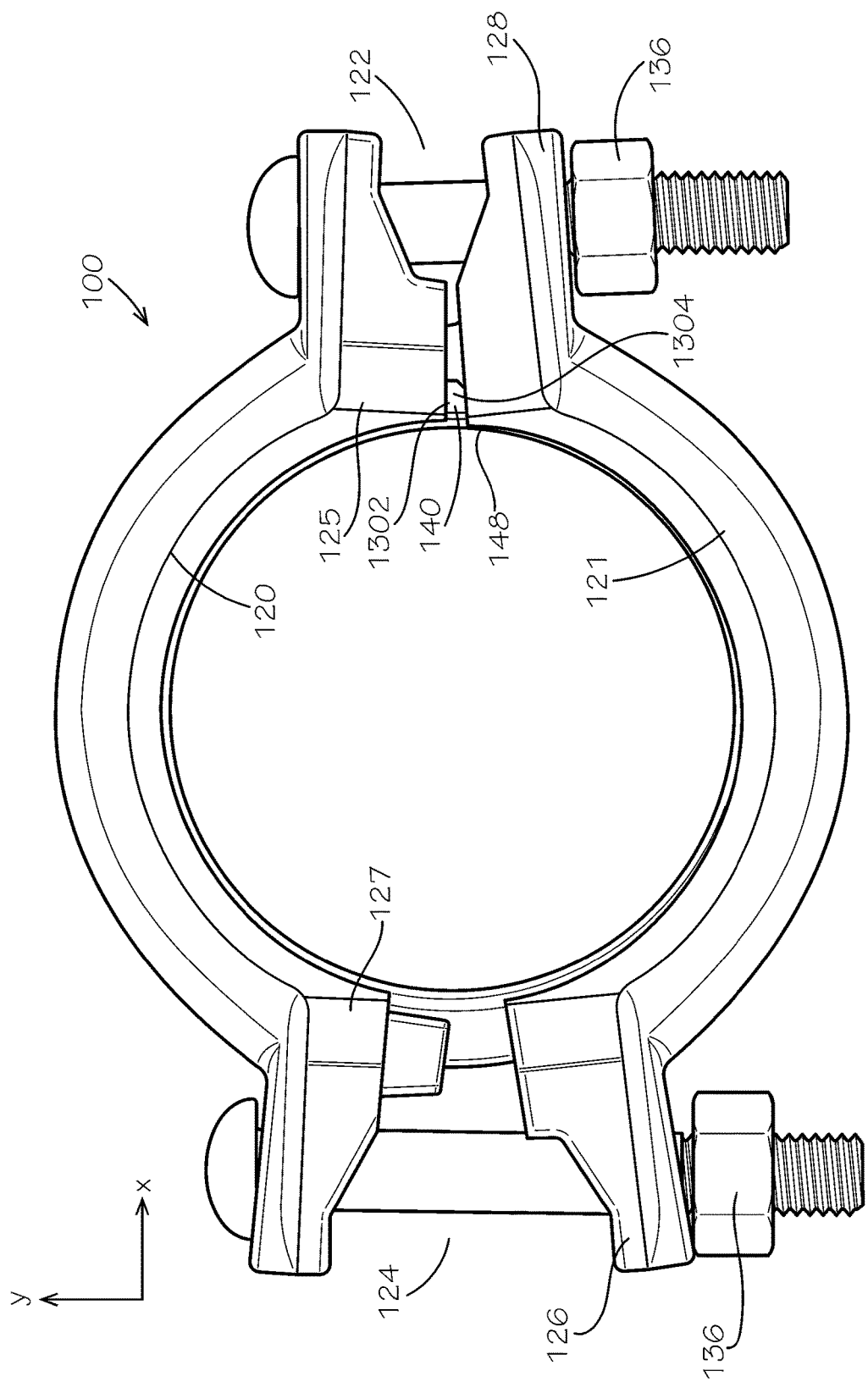
FIG. 14 is a side view of a pipe coupling comprising a pivot clip in accordance with another aspect of the present disclosure.

FIG. 14 shows another aspect of the pipe coupling 100 and the pivot clip 140, in accordance with the present disclosure. In this aspect, the pivot clip 140 can also be referred to as a pivot 1302. The pivot 1302 can be formed on one of the segments 120,121 of the pipe coupling 100. For example, the pivot 1302 can be part of a monolithically-casted segment 120,121. The pivot 1302 can be formed on the shoulders 125,127 of the segment 120,121. The pivot 1302 can be a first pivot 1304, and the segment 120,121 can further comprise a second pivot (not shown) on the same shoulder 125,127, such that the second pivot is a symmetric reflection of the first pivot 1304, the plane of symmetry being defined by the x-y plane of FIG. 14. The pivots can be positioned at an interior edge 148 of the shoulders 125,127. In the current aspect, the opposing or opposite end 122,124 of the segment 120,121 or pipe coupling 100 with the pivot 1302 can lack a pivot. The configuration in this aspect allows the opposing end to be tightened such that the pipe coupling 100 is stabilized around the pipes rigidly. Hence, the coupling 100 in this aspect can be named a rigid coupling. Angled washers (not shown) can be installed between the nuts 136 and the fastener pads 126,128 to reduce the point load on the mating bearing surfaces.

Figure 15:
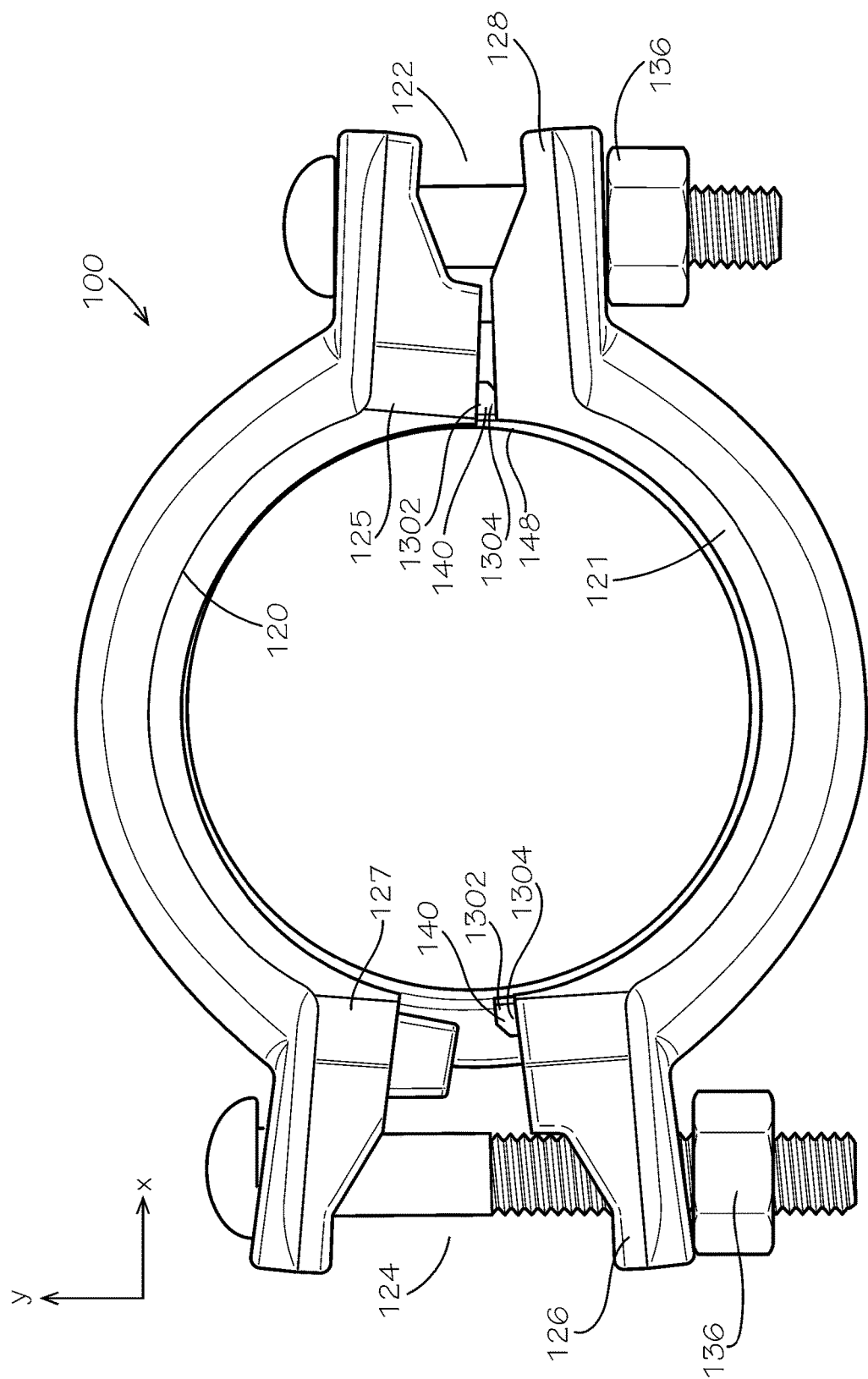
FIG. 15 is a side view of a pipe coupling comprising a pivot clip in in accordance with another aspect of the present disclosure.

FIG. 15 shows yet another aspect of the pipe coupling 100 and the pivot clip 140, in accordance with the present disclosure. In this aspect, the pivot clip 140 can also be referred to as a pivot 1302. The pivot 1302 can be formed on one of the segments 120,121 of the pipe coupling 100. The pivot 1302 can be a first pivot 1304, and the segment 120,121 can further comprise a second pivot 1602 (shown in FIG. 16) diagonally opposed on the same segment 120,121. In other words, the second pivot 1602 can be on an opposite end 122,124 of the segment 120,121, on an opposite side of the opposing shoulder 125,127. In other aspects, the second pivot (this configuration not shown) can be on the same shoulder 125,127 as the first pivot 1304, such that the second pivot 1602 is a symmetric reflection of the first pivot 1304, the plane of symmetry being defined by the x-y plane of FIG. 15. In the current aspect, both segments 120,121 of pipe coupling 100 can comprise pivots 1302. The pivots 1302 can be configured such that the segments 120,121 are 180-degree rotations of each other. As such, the segments 120, 121 can be casted from the same mold. The configuration in this aspect allows each end 122,124 to be tightened until the pivots 1302 make contact with the shoulders 125,127 from the opposing segment 120,121. This configuration can limit the bolting load applied to the pipes (not shown). As such, the pipe coupling 100 is in a flexible configuration around the pipes (relative to the rigid coupling). Hence, the coupling in this aspect can be named a flexible coupling.

FIG. 16 is a perspective view of one of the segments 120,121 from the pipe coupling of FIG. 15. The first pivot 1304 and the second pivot 1602 can be diagonally opposed, as explained for FIG. 15.

FIG. 17 is a close-up of one of the pivots 1302. The pivots 1302 can comprise an interior vertical edge 1604 substantially aligned with the interior edge 148 of the shoulders 125,127, a bottom edge 1606, and an outer edge 1608. A transition feature, such as a beveled corner 1610 or a rounded corner, can be defined between the bottom edge 1606 and the outer edge 1608.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A coupling segment comprising:
    an arcuate segment body defining a first end and a second end opposite the first end;
    a first shoulder that is formed proximate to the first end and comprises a first fastener pad extending outwardly from the arcuate segment body, the first shoulder further defining an interior edge; and
    a first pivot extending from the first shoulder at the interior edge, wherein the first pivot is cast monolithically with the arcuate segment body and the first shoulder, the first pivot defining a pivot interior edge, a pivot outer edge opposite the pivot interior edge, and a pivot bottom edge distal to the first shoulder;
    wherein the first pivot further defines a transition feature extending between the pivot bottom edge and the pivot outer edge, and wherein the transition feature is a beveled corner.

2. The coupling segment of claim 1, wherein the coupling segment further defines a first axial end and a second axial end opposite the first axial end, and wherein the first pivot is formed at the first axial end.

3. The coupling segment of claim 2, wherein the coupling segment further comprises:

a second shoulder formed at the second end, the second shoulder comprising a second fastener pad extending outwardly from the arcuate segment body; and a second pivot extending from the second shoulder, wherein the second pivot is cast monolithically with the arcuate segment body, the first shoulder, the second shoulder, and the first pivot.

4. The coupling segment of claim 3, wherein the second pivot is formed at the second axial end of the coupling segment.

5. The coupling segment of claim 1, wherein the first fastener pad extends in a first direction and the first pivot extends in a second direction substantially perpendicular to the first direction.

6. The coupling segment of claim 5, wherein the first fastener pad defines a fastener hole formed therethrough, and wherein a thickness of the first fastener pad is less than a thickness of the first shoulder.

7. The coupling segment of claim 1, wherein the pivot interior edge of the first pivot is a substantially vertical pivot interior edge extending from the first shoulder and substantially aligned with the interior edge of the first shoulder.

8. The coupling segment of claim 1, wherein the beveled corner defines a substantially planar sloped surface extending between the pivot bottom edge and the pivot outer edge.

9. A pipe coupling comprising:
a monolithically-cast first coupling segment comprising a first end and a second end distal to the first end, a first pivot formed proximate to the first end;
a second coupling segment comprising a first end and a second end distal to the first end, the first pivot engaging the second coupling segment proximate to the first end of the second coupling segment; and
a first tightening element configured to draw the first end of the monolithically-cast first coupling segment towards the first end of the second coupling segment;
wherein:
the first pivot is configured to pivot against a substantially planar pivot surface of the second coupling segment as the first end of the monolithically-cast first coupling segment is drawn towards the first end of the second coupling segment;
a first shoulder is formed proximate to the first end of the monolithically-cast first coupling segment;
the first shoulder comprises a first fastener pad; and
the first pivot extends from the first shoulder;
the first shoulder further defines an interior edge and the first pivot extends from the first shoulder at the interior edge;
the first pivot defines:
an interior vertical edge extending from the first shoulder and substantially aligned with the interior edge of the first shoulder;
an outer edge extending from the first shoulder;
a bottom edge; and
a transition feature between the bottom edge and the outer edge; and
the transition feature is a beveled corner.

10. The pipe coupling of claim 9, wherein the monolithically-cast first coupling segment further defines a first axial end and a second axial end opposite the first axial end, and wherein the first pivot is formed at the first axial end.

11. The pipe coupling of claim 10, wherein:
a second shoulder is formed proximate to the first end of the second coupling segment;
the second shoulder comprises a second fastener pad;
the first pivot engages the second shoulder; and
the first tightening element comprises a bolt and a nut disposed on the bolt, the bolt extending through the first fastener pad and the second fastener pad.

12. The pipe coupling of claim 11, wherein:
the second coupling segment defines a first axial end aligned with the first axial end of the monolithically-cast first coupling segment and a second axial end aligned with the second axial end of the monolithically-cast first coupling segment;
a second pivot extends from the second shoulder at the second axial end of the second coupling segment; and
the second pivot engages the first shoulder of the monolithically-cast first coupling segment.

13. The pipe coupling of claim 12, wherein:
the monolithically-cast first coupling segment further comprises a third shoulder that is formed proximate to the second end of the monolithically-cast first coupling segment and a third pivot extending from the third shoulder;
the second coupling segment further comprises a fourth shoulder that is formed proximate to the second end of the second coupling segment and a fourth pivot extending from the fourth shoulder;
the third pivot engages the fourth shoulder of the second coupling segment; and
the fourth pivot engages the third shoulder of the monolithically-cast first coupling segment.

14. The pipe coupling of claim 13, wherein:
the third shoulder comprises a third fastener pad;
the fourth shoulder comprises a fourth fastener pad; and
the pipe coupling further comprises a second tightening element extending through each of the third fastener pad and the fourth fastener pad; and
the second tightening element is configured to draw the first end of the monolithically-cast first coupling segment towards the first end of the second coupling segment.

15. The pipe coupling of claim 13, wherein the third pivot extends from the third shoulder at the second axial end of the monolithically-cast first coupling segment and the fourth pivot extends from the fourth shoulder at the first axial end of the second coupling segment.

16. The pipe coupling of claim 9, wherein the first fastener pad extends in a first direction and the first pivot extends in a second direction substantially perpendicular to the first direction.

17. The pipe coupling of claim 9, wherein the beveled corner defines a substantially planar sloped surface extending between the pivot bottom edge and the pivot outer edge.

* * * * *